April 17, 1951 W. D. STALDER 2,549,029
FISHING REEL OF THE TILTABLE SPOOL TYPE
Filed May 23, 1947 2 Sheets—Sheet 2
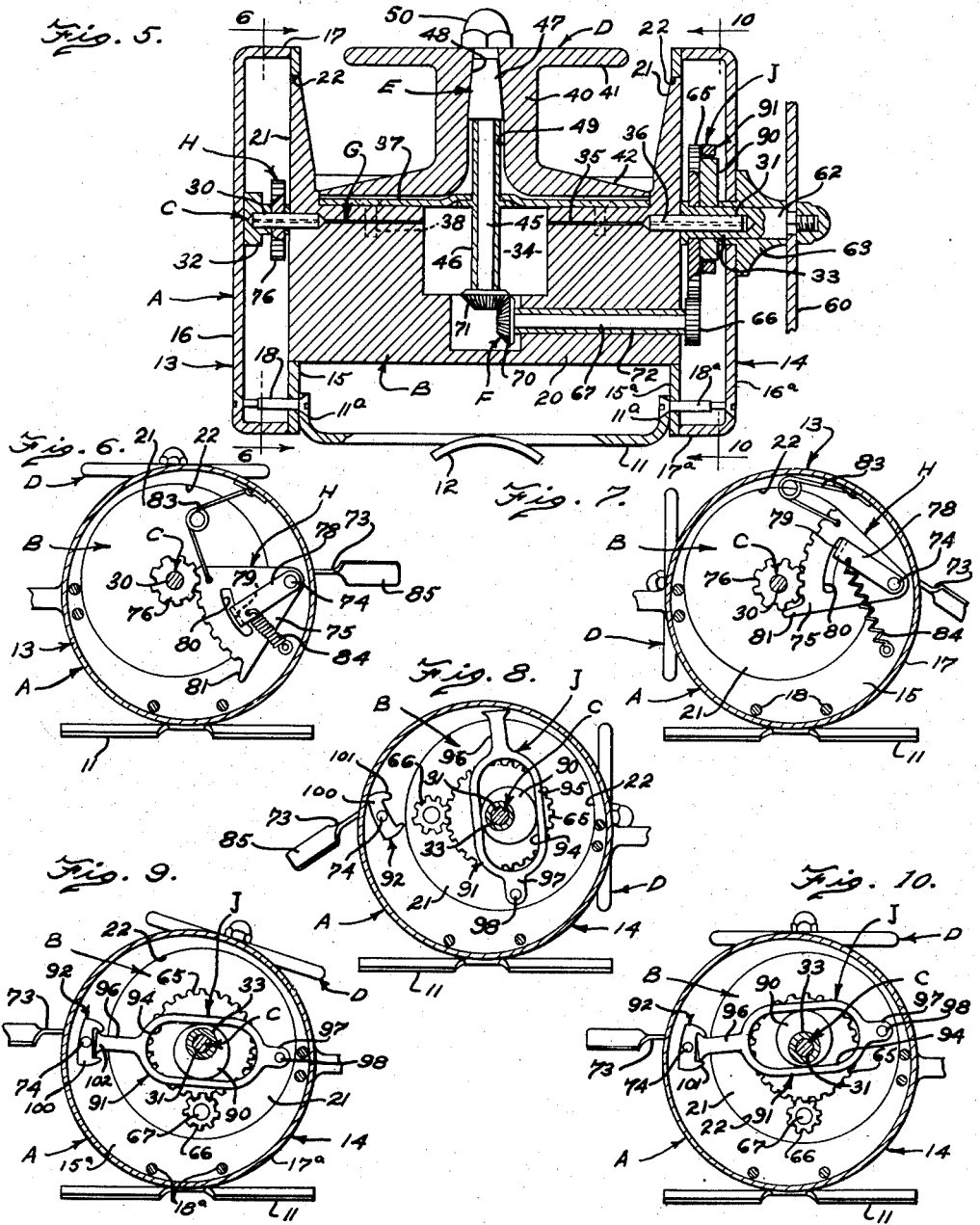
Inventor
William D. Stalder
By
Attorney Patented Apr. 17, 1951

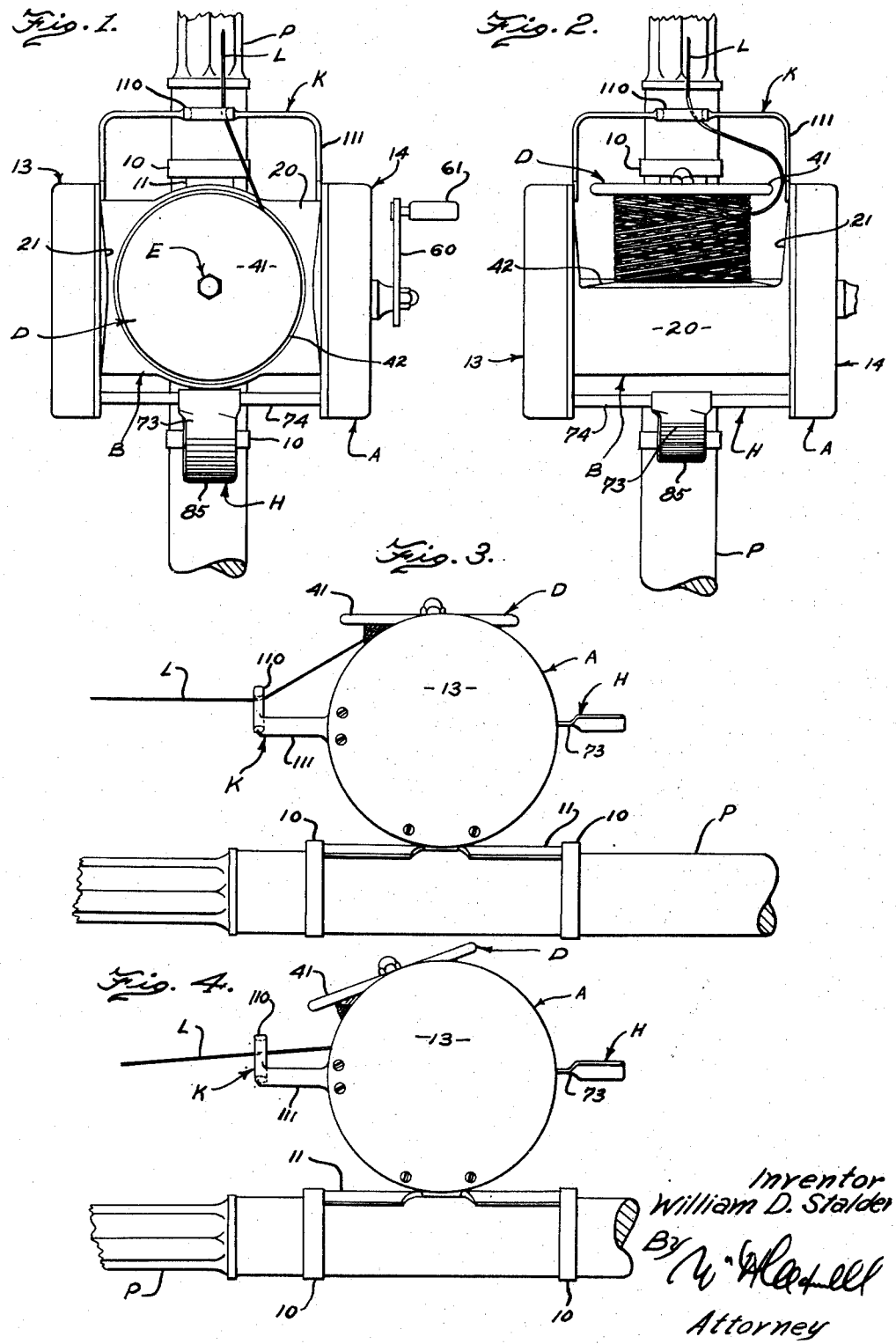

2,549,029

UNITED STATES PATENT OFFICE 2,549,029

FISHING REEL OF THE TILTABLE SPOOL TYPE

William Dale Stalder, Newhall, Calif.

Application May 23, 1947, Serial No. 750,030

22 Claims. (Cl. 242—84.4)

This invention has to do with a fishing reel of the tiltable spool type, and it is a general object of the invention to provide a reel of simple, practical improved construction that can be used to advantage in casting.

My present invention is concerned primarily with certain features of construction and with improvements in a tilting spool type of fishing reel, which general form or type of reel is more fully described and is claimed in my copending application "Fishing Gear," filed April 1, 1947, Serial No. 738,508.

It is a general object of the present invention to provide a spool of the general character above referred to which involves a spool carrying cradle shiftable between two extreme positions, one a casting position and the other a reeling position, and free to rock or oscillate to a limited extent in the reeling position to facilitate the distribution of line onto the spool as the reeling operation occurs.

A further object of the invention is to provide a reel of the general character mentioned involving manual control means or manual operating means for shifting the cradle to move the spool between the two extreme positions and a mechanical drive for rocking or oscillating the cradle as the reel operates to wind line.

Another object of the invention is to provide a reel construction of the general character referred to wherein the means provided for oscillating or rocking the cradle is related to the drive for the spool so that the cradle is rocked or oscillated in synchronism with rotation of the spool.

It is a further object of the present invention to provide a reel construction of the general character referred to including a line guide located to guide the line relative to the spool to facilitate both reeling and casting of the line.

It is a further object of the present invention to provide a reel construction of the general character referred to involving a simplified inexpensive and improved construction making the reel practical and inexpensive of manufacture.

The various objects and features of my invention will be fully understood from the following detailed description of a typical preferred form and application of the invention, throughout which description reference is made to the accompanying drawings, in which:

Fig. 1 is a plan view of the reel that I have provided showing it applied to a pole and with the spool in the reeling position with a line being guided to the spool. Fig. 2 is a view similar to Fig. 1 showing the spool in casting position with the line being guided therefrom. Fig. 3 is a side elevation of the construction showing the parts positioned as illustrated in Fig. 1. Fig. 4 is a view similar to Fig. 3 showing the spool rocked to a position such as it takes in the course of the reeling operation, in order to facilitate distribution of the line onto the spool. Fig. 5 is an enlarged detailed transverse sectional view of the spool construction that I have provided. Fig. 6 is a reduced sectional view taken substantially as indicated by line 6—6 on Fig. 5, showing the parts in the position that they are in in the course of reeling the line onto the spool. Fig. 7 is a view similar to Fig. 6, showing the parts in the position that they take when the spool is in casting position. Figs. 8, 9 and 10 are reduced views taken substantially as indicated by line 10—10 on Fig. 5, showing several positions of the rocking mechanism, Fig. 8 showing the mounting means of the rocking mechanism released, Fig. 9 showing the mounting means of the rocking mechanism engaged and the spool in one extreme rocked position, and Fig. 10 is a view similar to Fig. 9, showing the spool in the other extreme rocked position.

The reel of the present invention involves, generally, a frame A, a cradle B carried by the frame A through mounting means C, a spool D carried by the cradle through a mounting E, drive means F for the mounting of the spool, lubricant handling means G, shifting means H operable to shift the cradle so that the spool is moved between a reeling position and a casting position, rocking means J for the cradle operable to rock or oscillate the cradle as the spool is rotated to reel the line onto it, a line guide K and various other features and elements, the details of which will be hereinafter described.

The frame A is a fixed and preferably a rigid element of the construction designed to be mounted on a pole P, as through releasable mounting collars 10, or the like, such as are ordinarily employed in mounting a reel on a pole. In the form illustrated the frame involves, generally, a base 11 with a saddle or pole seat 12 that bears on the pole and ends 13 and 14 carried by and projecting from the base. The base, as illustrated, may be a plate with the pole seat formed in or as a part of it, and it may have upwardly projecting flanges 11$^a$ at opposite edges carrying the ends 13 and 14. The ends 13 and 14 are spaced opposed case-like elements between which the cradle B and spool D are located, and in accordance with my preferred construction they are substantially the same in form and construction.

The end 13 of frame A is shown as involving a flat disc-shaped inner wall 15, a flat disc-shaped outer wall 16, and an annular or ring-like peripheral wall 17 which extends between the peripheral portions of the walls 15 and 16. In the case illustrated the peripheral wall 17 is formed with the outer wall 16 as an integral continuation thereof, while the wall 15 is a separate part, as clearly shown in Fig. 5. Suitable simple fastening devices such as screw fasteners 18 are provided connecting the inner wall 15 to a flange 14 and connecting the inner and outer walls together so that the end is held assembled and firmly in place on the base 11.

The end 14 is similar in construction to the end 13 and involves an inner wall 15$^a$, an outer wall 16$^a$ and a peripheral wall 17$^a$, the parts being joined to the other flange of the base by suitable fasteners 18$^a$.

The cradle B is located within or confined to the frame A between the ends 13 and 14 thereof and is pivotally supported through the means C to be shiftable between positions such as are shown in Figs. 1 and 2 and to be freely rocked between positions such as are shown in Figs. 3 and 4.

The particular cradle illustrated involves, generally, a body 20 and disc-shaped end plates 21 at the ends of the body. In the preferred construction the end plates of the cradle enter or operate at large bores or opening 22 in the inner walls 15 and 15$^a$ of the ends of the frame, although I do not depend upon engagement between the end plates 21 and the ends of the frame for bearing support of the cradle in the frame. The body 20 of the cradle is offset from the pivotal axis of the cradle so that the end plates 21 of the cradle project so that the cradle forms a receptacle into which the spool D fits as illustrated throughout the drawings.

The mounting means C provided for the cradle pivotally supports the cradle for the shifting and rocking movements of the cradle, as above described, and in practice may vary widely in form. In the particular case illustrated the mounting means C involves spindles 30 and 31 concentric with the axis of the cradle and projecting from the ends thereof, spindle 30 being carried in a bearing 32 in the end 13 of the frame and the spindle 31 being carried in a bearing or supporting part 33 in the end 14 of the frame.

The lubricating means G that I have provided involves a lubricant chamber 34 in the body 20 of the cradle and ducts 35 extending from the chamber 34 to the inner ends of the spindles 30 and 31, the spindles being provided with central lubricant distributing passages 36 which may extend to the outer ends of the spindles as shown in the drawings. The lubricant chamber 34 is so located in the body of the cradle as to carry a body of lubricant so that it readily finds its way to the other working parts of the mechanism as will be apparent from the drawings, particularly Fig. 5 thereof. In practice the chamber 34 may be made large enough to carry a supply of lubricant to last for a very long time, possibly the life of the reel. The chamber 34 is formed in the body by providing a recess in the body from the top thereof and the chamber is closed by a cover plate 37 which closes or seals the top of the body 20 and which may be held in place by suitable fasteners such as screws 38.

The spool D may be a simple line carrying spool involving a central hub 40 into which a line L may be wound, and it may have end flanges 41 and 42 for confining the line to the hub. Flange 41 is the outer or uppermost flange of the spool and is the flange over or around which the line passes, as it pays off of the spool, and it may be somewhat smaller in diameter than the flange 42. The flange 42 being the inner flange operates adjacent the plate 37 of the cradle and may be substantially co-extensive therewith, as shown in the drawings.

The mounting means E for the spool D preferably includes a spindle 45 carried in a bearing 46 on the cradle and a head 47 on the spindle fitting a socket 48 in the hub 40 of the spool. In the particular form of the invention illustrated the bearing 46 is carried by the plate 37 of the cradle to project a substantial distance upwardly therefrom and to also project into the chamber 34. The spool has a central passage 49 accommodating the upwardly projecting portion of the bearing and the socket 48 is formed at the upper end of the opening 49. The head 47 and socket 48 are preferably tapered, as shown in Fig. 5 so that the spool may be set on the spindle and a suitable retainer such as a nut 50, or the like, may be applied to the end of the spindle above the spool to retain the spool on the spindle, that is, to retain the tapered head 47, preferably seated in the socket 48.

The drive means F provided for driving or rotating the spool preferably drives the spool through the spindle 45 and in the form of the invention illustrated it is a manually operated means. The construction illustrated in the drawings involves an operating lever 60 at the outer side of the frame end 14 which lever carries an operating knob 61. The lever 60 is fixed on a drive shaft 62 rotatably supported in a bearing 63 carried by the outer wall 16$^a$ of end 14. The drive shaft 62 projects into the frame end 14 where its inner end portion forms the supporting part 33 for spindle 31. A drive gear 65 is carried on the inner end portion of the drive shaft or within the end 14 and meshes with a gear 66 on a countershaft 67. The countershaft 67 is mounted in the body 20 of the cradle and extends from the end 21 to the central portion of the cradle where it projects into the chamber 34. In the chamber 34 there is a driving connection between the countershaft 67 and the spindle 45, preferably a gear drive. I have shown a bevel gear drive between the countershaft and spindle involving a drive pinion 70 fixed on the countershaft, meshing with and driving a gear 71 fixed on the spindle 45. I have shown a bearing bushing 72 supporting the countershaft in the body 20 of the cradle and it will be apparent that lubricant from chamber 34 will find its way along the countershaft to the gear drive within the end 14 of the frame, and it will also find its way along the spindle 45 to lubricate the spindle in the bearing 46.

The means H provided for shifting the cradle is operable to shift the cradle between what I will term a reeling position such as is shown in Figs. 1, 3, 4, 5, 6, 9 and 10 of the drawings, and a casting position as is shown in Figs. 2, 7 and 8 of the drawings. The means H is a manually operable means involving primarily an operating lever 73 and a suitable drive between the lever and the cradle. In the particular case illustrated the lever is carried by a rocker shaft 74 to project toward the handle end of the pole P and the rocker shaft is geared to the cradle. The rocker shaft is pivotally supported at its ends by the ends 13 and 14 of the frame. The drive between the rocker shaft and the cradle is preferably located within the end 13 of the frame and involves a gear segment 75 operated by or from the rocker shaft and a gear 76 fixed on the spindle 30 of the cradle. The segment 75 meshes with and drives the gear 76.

For reasons which will hereinafter appear it is desirable that there be certain play or free movement in the means H so that the lever 73 and rocker shaft 74 have initial free movement before the segment 75 operates to drive the gear 76. To gain this free movement in the means H the segment 75 is freely pivotally supported on the rocker shaft 74 and the drive from the rocker shaft to the segment is through an arm 78 fixed on the rocker shaft and having a drive head 79 operating in a segmental opening 80 in the segment, as shown in Figs. 6 and 7 of the drawings. When the operating lever 73 is in the normal unactuated position, as shown in Fig. 6, the arm 78 is depressed or down and in the lower end portion of the segmental opening 80 in the segment, whereas when the lever 73 is depressed or operated as shown in Fig. 7 the arm 78 has moved to an up position, and in so doing has engaged the upper end of the opening 80 in the segment, and has moved the segment to the up position shown in Fig. 7.

A stop lug 81 is provided on the segment to engage the gear 76 to limit the movement of the mechanism just described so that the mechanism is stopped in a position where the spool D is in casting position or has its axis located substantially parallel with that of the pole P. Any suitable means may be provided for normally yieldingly holding the parts in the normal unactuated position. In the drawings I have shown a suitable spring 83 within the ends 13 of frame A which spring normally bears downwardly on the segment 75 to normally yieldingly urge it to the down or unactuated position shown in Fig. 6. A suitable spring 84 is arranged to engage the arm 78 and serves to normally yieldingly hold the rocker shaft and operating lever in the position shown in Fig. 6. In accordance with the preferred form of my invention the outer or projecting end of the operating lever 73 is provided with a thumb piece 85 proportioned and pitched to be conveniently engaged by the thumb of the operator or user of the equipment.

The rocking means J that I have provided serves to rock or tilt the cradle through a limited arc when the reel is in reeling position, that is, when the axis of the spool is substantially normal to that of the pole P. By rocking or varying the angularity or position of the axis of the spool relative to that of the pole somewhat from the normal position so that the spool oscillates or rocks to a limited extent, as it is rotated, to reel the line onto it, I effect proper distribution of the line onto the spool. The rocking means J in the form of the invention illustrated in the drawings, is a cam means and in the particular embodiment of the invention shown this cam means includes, generally, a cam 90, a yoke 91, and a releasable mounting means 92 for the yoke.

The mechanism just referred to, that is, the means J, is preferably located within the end 14 of the frame A in which case it is convenient to locate the cam 90 on the drive shaft 62 or on the inner end portion 33 of the shaft 62, as shown in Fig. 5. The cam may be a simple disc-shaped member mounted eccentrically on the shaft portion 33 adjacent the gear 65. It is to be understood, of course, that the cam is fixed on the shaft to rotate therewith. The yoke 90 has an elongate cam opening 94 formed by spaced parallel sides 95 joined at one end to an inner arm 96 and at the other end to an outer arm 97. The outer arm 97 is pivotally connected to the cradle or to one end plate 21 of the cradle by a pivot pin 98 while the other or inner arm 96 of the yoke is connected to the rocker shaft 74 by the releasable connecting means 92. The sides 95 are spaced apart to accommodate the cam 90 and are of such length as to allow free or full rotation of the cam when the inner arm 96 of the yoke is held by the means 92.

The mounting means 92 forms, in effect, a releasable pivotal support for the inner arm 96 of the yoke so that as the cam 90 rotates it oscillates the yoke causing the outer arm 97 of the yoke to oscillate with corresponding oscillation of the cradle.

The releasable mounting means 92 may vary widely in form and construction. However, in its simple form shown in the drawings, it includes, generally, a bearing block 100 fixed on the rocker shaft within the end 14 of the frame to rock or oscillate with the shaft 74. The bearing block 100 has spaced projecting ears 101 faced toward the yoke and cam and the inner arm 96 of the yoke has a head 102 releasably engageable between the ears. When the rocker shaft 74 is in the normal position with the operating lever 73 positioned as shown in Fig. 6, the ears 101 both face directly toward the cam or toward the cam axis. With the bearing block 100 thus positioned the head 102 is confined between the ears with only enough clearance to allow pivotal movement of the yoke between the positions shown in Figs. 9 and 10 of the drawings.

When the rocker shaft is initially operated as by depressing the lever 73 and before the arm 78 picks up and starts to move the segment 75 the bearing block 100 is tilted to a position where the uppermost ear 101 projecting from the bearing block is withdrawn from the head 102 leaving the head free to move up and allowing the yoke to swing to a position such as is shown in Fig. 8, as the arm 73 is fully operated tilting the cradle to the casting position. When the lever 73 is released a reversal of the operation just described occurs, that is, the segment 75 moves down and the yoke swings back to a position where the head 102 is opposite the bearing block 100 and as the parts reach their final normal position the bearing block rocks to a final position where the upper ear confines the head between the ears of the block. As the yoke oscillates the head 102 may rock between the ears 101 or the block may rock with the shaft 74 or both of these actions may occur to some extent.

The line guide K may or may not be used and when used it may involve merely a simple eye 110 located a short distance forward of the spool to pass the line to or from the spool as shown in Figs. 1, 2, 3 and 4 of the drawings. I have found it advantageous to locate the eye 110 as close as possible to the spool in order to minimize whipping of the line as it is cast from the spool. In the particular case illustrated the eye 110 is carried by arms 111 secured to and projecting from the ends 13 and 14 of the frame so that it remains in a fixed position at all times. It is advantageous to locate the eye so that it offers minimum resistance to the line as the line is being cast.

From the foregoing description it will be apparent that I have provided a line handling reel particularly suited for use by fishermen. The reel that I have provided can be used to great advantage in casting since no part of the reel has to move or work as the line is cast but rather the line merely pays off of or around the end flange 41 of the spool. It is also significant to note that I have provided a particularly simple yet effective means of laying or distributing the line on the spool so that it does not pile up at any one part of the spool and so that it will cast with maximum freedom. As the reel is operated to rotate the spool causing the line to be wound onto the spool the slight oscillation given the carriage and consequently the spool through the means J effectively and uniformly distributes the line back and forth on the spool between the end flanges thereof, all without any effort whatever on the part of the operator.

It is also significant to note that I have provided a very simple inexpensive construction for a reel of the general character referred to. The frame A, in particular, is of simple, inexpensive construction involving ends which are substantially alike and the various parts thereof, except for the bearings, may be all formed of sheet metal, making for strong, light construction.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A reel of the character described including a frame, a cradle pivotally supported by the frame, a line carrying spool rotatably carried by the cradle, the frame and cradle having parts defining a closed chamber removed from the spool, means operating the cradle to shift the spool between a reeling position where the line engages the spool tangentially and a casting position where the line leaves the spool axially thereof and a manually operated drive for the spool and cradle including cam means confined within said chamber and rocking the cradle a limited amount while the spool is rotated in the reeling position.

2. A reel of the character described including a frame, a cradle pivotally supported by the frame, a spool carried by the cradle, means operating the cradle to shift the spool between a reeling and a casting position, and means rocking the spool in the reeling position including a cam operating with the spool and a member engaged with the frame and cooperating with the cam.

3. A reel of the character described including a frame, a cradle pivotally supported by the frame, a spool carried by the cradle, means operating the cradle to shift the spool between a reeling and a casting position, and means rocking the spool in the reeling position including a cam operating with the spool and a yoke member engaged with the frame and cooperating with the cam.

4. A reel of the character described including a frame, a cradle pivotally supported by the frame, a spool carried by the cradle, means operating the cradle to shift the spool between a reeling and a casting position, and means rocking the spool in the reeling position including a cam operating with the spool and a pivotally mounted member cooperating with the cam.

5. A reel of the character described including a frame, a cradle pivotally supported by the frame, a spool carried by the cradle, means operating the cradle to shift the spool between a reeling and a casting position, and means rocking the spool in the reeling position including a cam operating with the spool, a yoke engaging the cam, and means pivotally supporting the yoke.

6. A reel of the character described including a frame, a cradle pivotally supported by the frame, a spool carried by the cradle, means operating the cradle to shift the spool between a reeling and a casting position, and means rocking the spool in the reeling position including a cam operating with the spool, a yoke engaging the cam, and a releasable pivotal support for the yoke disengaged upon the cradle being shifted from the reeling position to the casting position.

7. A reel of the character described including a frame, a cradle pivotally supported by the frame, a spool carried by the cradle, means operating the cradle to shift the spool between a reeling and a casting position, and means rocking the spool in the reeling position including a cam operating with the spool, a yoke engaging the cam, and a releasable pivotal support for the yoke released by initial operation of the first mentioned means shifting the cradle from the reeling to the spooling position.

8. A reel of the character described including, a frame, a cradle pivotally carried by the frame, a spool carried by the cradle, a manually operable rocker member, a drive from the rocker member to the cradle for shifting the cradle to move the spool between a reeling and a casting position, and means rocking the cradle when the spool is operated in the reeling position including a cam driven with the spool, a member pivoted to the cradle and engaged by the cam, and a releasable pivotal support for said member controlled by the rocker.

9. A reel of the character described including, a frame, a cradle pivotally carried by the frame, a spool carried by the cradle, a manually operable rocker member, a drive from the rocker member to the cradle for shifting the cradle to move the spool between a reeling and a casting position, and means rocking the cradle when the spool is operated in the reeling position including a cam driven with the spool, a member pivoted to the cradle and engaged by the cam, and a releasable pivotal support for said member controlled by the rocker, the drive from the rocker to the cradle including means providing free movement of the rocker to release the pivotal support before the cradle is operated when said drive is operated to move the spool from the reeling to the spooling position.

10. A reel of the character described including, a frame, a cradle pivotally carried by the frame, a spool carried by the cradle, means for rotating the spool, a manually operable rocker member, a drive from the rocker member to the cradle for shifting the cradle to move the spool between a reeling and a casting position, and means rocking the cradle when the spool is operated in the reeling position including a cam driven with the spool, a member pivoted to the cradle and engaged by the cam, and a releasable pivotal support for said member controlled by the rocker.

11. A reel of the character described including, a frame, a cradle pivotally carried by the frame, a spool carried by the cradle, a manually operable rocker member carried by the frame and having a projecting hand lever, a drive from the rocker member to the cradle for shifting the cradle to move the spool between a reeling and a casting position, and means rocking the cradle when the spool is operated in the reeling position including a cam driven with the spool, a member pivoted to the cradle and engaged by the cam, and a releasable pivotal support for said member controlled by the rocker.

12. A reel of the character described including, a frame, a cradle pivotally carried by the frame, a spool carried by the cradle, a manually operable rocker member, a drive from the rocker member to the cradle for shifting the cradle to move the spool between a reeling and a casting position, and means rocking the cradle when the spool is operated in the reeling position including a cam driven with the spool, a member pivoted to the cradle and engaged by the cam, and a releasable pivotal support for said member controlled by the rocker, the drive from the rocker to the cradle including, a pivoted gear segment, a gear driven by the segment and operating the cradle, and an arm driven by the rocker engaging and operating the segment after operation of the rocker to release the pivotal support.

13. A reel of the character described including, a frame with spaced ends having bearings, a cradle between the ends having spindles projecting into the bearings and having a lubricant carrying chamber, a spool carried by the cradle, lubricant carrying ducts connecting the chamber and spindles, and a drive for the spool including working parts in the said chamber.

14. A line handling reel for use on a fishing pole including, a frame applicable to the pole, a line carrying spool, means supporting the spool from the frame to rotate about its axis and to tilt between a reeling position where its axis is in a plane disposed transversely of the longitudinal axis of the pole and a casting position where its axis is parallel with that of the pole, and a drive having a drive shaft carried by the frame, a single manually engaged operator fixed on the shaft, and means driven by the shaft and acting to simultaneously rotate the spool and tilt it a limited amount while in the reeling position, said last mentioned means including a cam fixed on the shaft and a cam follower carried by the frame and cooperating with the cam.

15. A line handling reel for use on a fishing pole including, a frame applicable to the pole, a line carrying spool, means supporting the spool from the frame to rotate about its axis and to tilt between a reeling position where its axis is in a plane disposed transversely of the longitudinal axis of the pole and a casting position where its axis is parallel with that of the pole, and a drive having a shaft carried by the frame, a hand crank on the shaft at the exterior of the frame, a gear train driving the spool from the shaft, and means tilting the spool a limited amount while the spool is in the reeling position and the crank is operated including a cam fixed on the shaft and a cam follower pivoted to the frame and operatively connected with the spool.

16. A line handling reel for use on a fishing pole including, a frame applicable to the pole, a line carrying spool, means supporting the spool from the frame to rotate about its axis and to tilt between a reeling position where its axis is in a plane disposed transversely of the longitudinal axis of the pole and a casting position where its axis is parallel with that of the pole, and a drive having a single manually engaged operator and acting to simultaneously rotate the spool and tilt it a limited amount while in the reeling position, the drive including a cam operating continuously with the spool and oscillating a member operating to tilt the spool.

17. A line handling reel for use on a fishing pole including, a frame applicable to the pole, a line carrying spool, means supporting the spool from the frame to rotate about its axis and to tilt between a reeling position where its axis is in a plane disposed transversely of the longitudinal axis of the pole and a casting position where its axis is parallel with that of the pole, and means rocking the spool in the reeling position including a cam operating with the spool and a pivoted member cooperatively engaged by the cam.

18. A reel of the character described including a frame, a cradle pivotally supported by the frame, a spool carried by the cradle, means operating the cradle to shift the spool between a reeling and a casting position, and means rocking the spool in the reeling position including a cam operating with the spool and a member cooperatively engaged by the cam and having one end engaged with the frame and the other end engaged with the cradle.

19. A line handling reel for use on a fishing pole including, a frame applicable to the pole, a line carrying spool, means supporting the spool from the frame to rotate about its axis and to tilt between a reeling position where its axis is in a plane disposed transversely of the longitudinal axis of the pole and a casting position where its axis is parallel with that of the pole, a drive rotating the spool, and means rocking the spool while the spool is rotated in the reeling position including a cam driven with the spool, a member driven by the cam, and releasable means holding said member in operating position.

20. A reel of the character described including a frame, a cradle pivotally supported by the frame, a line carrying spool rotatably carried by the cradle on an axis normal to the axis of the cradle, means operating the cradle to shift the spool between a reeling position where the line engages the spool tangentially and a casting position where the line leaves the spool axially thereof, a line guide carried by the frame in a fixed position substantially in line with the axis of the spool when the spool is in casting position, and a drive simultaneously rotating the spool and rocking the cradle with the spool in the reeling position, the drive including a shaft carried by the frame, a hand crank on the shaft at the exterior of the frame, a gear drive from the shaft to the spool, a cam fixed on the shaft, a cam follower pivotally carried by the frame and operated by the frame, and a releasable drive from the follower to the cradle.

21. A reel of the character described including a frame, a cradle pivotally supported by the frame, a line carrying spool rotatably carried by the cradle on an axis normal to the axis of the cradle, means operating the cradle to shift the spool between a reeling position where the line engages the spool tangentially and a casting position where the line leaves the spool axially thereof, and a drive simultaneously rotating the spool and rocking the cradle with the spool in the reeling position, the drive including a single manually engaged operating part carried by the frame in a fixed location at the exterior thereof.

22. A reel of the character described including a frame, a cradle pivotally supported by the frame, a line carrying spool rotatably carried by the cradle on an axis normal to the axis of the cradle, means operating the cradle to shift the spool between a reeling position where the line engages the spool tangentially and a casting position where the line leaves the spool axially thereof, a line guide carried by the frame in a fixed position substantially in line with the axis of the spool when the spool is in casting position, and a drive simultaneously rotating the spool and rocking the cradle with the spool in the reeling position, the drive including a single manually engaged operating part carried by the frame in a fixed location at the exterior thereof.

WILLIAM DALE STALDER.

REFERENCES CITED

The following references are of record in the file of this patent:

UNITED STATES PATENTS

| Number | Name | Date |
| --- | --- | --- |
| 1,663,853 | Newville | Mar. 27, 1928 |
| 2,299,156 | Lind | Oct. 20, 1942 |
| 2,332,481 | Boor | Oct. 19, 1943 |

FOREIGN PATENTS

| Number | Country | Date |
| --- | --- | --- |
| 813,087 | France | Feb. 15, 1937 |
| 816,045 | France | Apr. 19, 1937 |